Feb. 28, 1956 E. LIDOW 2,736,850
SELENIUM RECTIFIER CONTAINING TELLURIUM
Filed Nov. 24, 1952
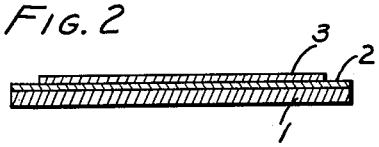
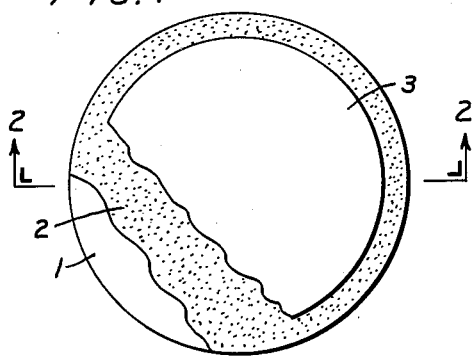
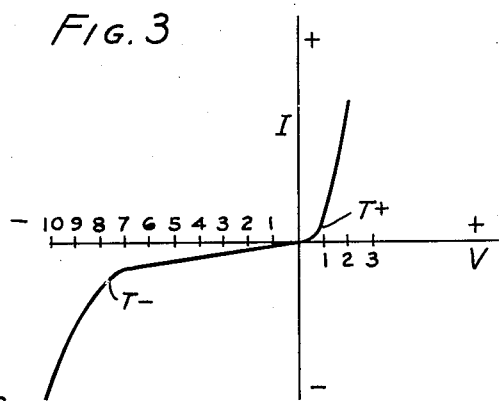
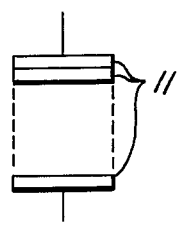
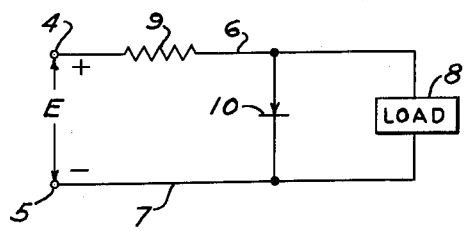
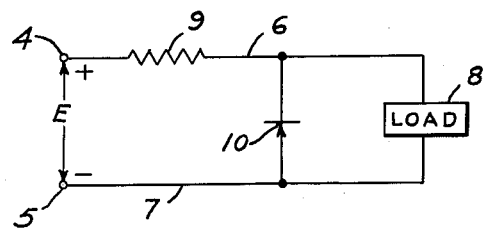
INVENTOR.
ERIC LIDOW
BY D. Gordon Angus
ATTORNEY.

United States Patent Office 2,736,850
Patented Feb. 28, 1956

2,736,850

SELENIUM RECTIFIER CONTAINING TELLURIUM

Eric Lidow, Los Angeles, Calif.

Application November 24, 1952, Serial No. 322,291

4 Claims. (Cl. 317—241)

This invention relates to selenium rectifiers and more particularly to such rectifiers which are adapted for use as voltage regulating devices.

Rectifiers such as dry plate selenium rectifiers have heretofore been proposed for use as voltage regulating elements. They can be used for this purpose because of their non-linear characteristic of conductivity v. voltage. For example, a selenium rectifier does not have a good conductivity in the forward current flowing direction until a certain threshold value of voltage is reached, ordinarily around .6 volt, at which point the conductivity suddenly increases so that the current rises rapidly with increase of voltage above the threshold value.

A drawback to the use of such rectifying elements for voltage regulating purposes resides in the low threshold voltage. Since most loads operate at much higher voltages than the order of .6 volt, an element having a threshold at only .6 volt is not ordinarily useful. It is possible to build up the voltage at which a rectifier can be used for regulating purposes by arranging a plurality of rectifying elements in series. For example, ten selenium elements in series, each having a threshold at .6 volt would have a combined threshold of about 6 volts; and this is useful for some loads such as 6 volt filaments of vacuum tubes. But it is hardly practical to go much beyond six to ten volts in this manner.

It is known that selenium rectifiers have a negative threshold in addition to their positive threshold, the negative threshold being at a value where the voltage in the reverse direction begins to produce an increase of conductivity in the reverse direction. The negative threshold ordinarily occurs at a much higher voltage than the positive or forward threshold, and for this reason it has been proposed to use the negative threshold for regulation.

A serious drawback, however, to the use of the negative threshold for regulation, however, resides in the fact that it has a bad drift characteristic which changes the threshold voltage with age and use. Since it is a requirement of a regulating device that its regulating point shall remain substantially constant it is apparent that a drifting threshold is undesirable.

A principal object of the present invention is to provide a selenium rectifier whose negative threshold voltage is stabilized at a substantially constant value.

In accordance with the present invention, a way is provided for stabilizing the negative threshold of a selenium rectifier; and this is accomplished by adding to the selenium a very small amount of tellurium. The proportion of the tellurium should lie between about 90 and 1200 parts of tellurium by weight per million parts by weight of the selenium. If less than that amount of tellurium is present, the stabilization will be insufficient, and if a substantially greater amount of tellurium be used the element will not rectify.

The foregoing and other features of the invention will be better understood from the following detailed description and the accompanying drawing of which:

Fig. 1 shows a top view of a selenium rectifier which may be made according to the present invention, the rectifier being shown with some of its layers broken away for illustration;

Fig. 2 is a cross section view taken at line 2—2 of Fig. 1;

Fig. 3 shows a characteristic curve of current versus voltage of the rectifier of Figs. 1 and 2;

Fig. 4 shows a simple circuit in which the rectifying element of Figs. 1 and 2 may be used for regulating purposes;

Fig. 5 shows the use of a plurality of rectifying elements in tandem; and

Fig. 6 shows a modification of the circuit of Fig. 4 in accordance with the invention.

Referring to Figs. 1 and 2 there is shown a selenium rectifier of a well known type comprising a base plate 1, ordinarily of a metal such as a ferrous metal or aluminum which is preferably roughened, and also preferably nickel-coated, on its upper surface to receive and hold adherent to it a layer 2 of crystallized selenium. Over the selenium layer there is a third layer 3 called the counter-electrode, ordinarily an alloy such as an alloy of cadmium and bismuth, which may be present in about equal proportions by weight. Additives are also commonly used for improved performance, such as halogen mixed into the selenium for improved conductivity in the forward direction. Furthermore, substances are commonly applied over the selenium surface before application of the counterelectrode for improving the barrier layer at the interface of the selenium and the counterelectrode. Such an element is made into a rectifier by an electroforming process which can be carried out by application of an A. C. voltage across the base plate and counterelectrode, ordinarily in series with some resistance. This will develop the barrier layer which produces the rectifying action.

Such selenium elements and the methods of making them are well known in the art and need no detailed explanation here. The layer 2 is known as a semi-conductor, as it functions to conduct current much more readily in one direction than in the other, which produces the rectifying action.

Dry plate selenium rectifiers of this type are connected in a circuit by use of a suitable conductive contact element which makes a substantial surface contact with the counterelectrode; and the element has as one of its terminals the base plate 1, and as the other terminal, the counterelectrode 3 or the contact element in contact with it.

Such a selenium element in circuit with a voltage across it has a characteristic such as is shown in Fig. 3 which is a graph of volts V across the selenium element against current I through the element. At zero voltage there is zero current through the rectifier, and no appreciable current flows through the rectifier until the voltage reaches a threshold value represented by T+ which is normally at about .6 volt. Beyond this voltage, the current rises rapidly with increase of voltage in positive or forward direction of the rectifier. When voltage is applied in the reverse direction, however, there is practically no current through the rectifier until this reverse or negative voltage reaches a substantial value at some threshold point T—, beyond which the current in the reverse or negative direction increases rapidly with increase of the negative voltage.

The knees of the characteristic curve at T+ and T—, respectively, have been proposed for use as voltage regulators. Fig. 4, for example, shows a simple voltage regulating circuit for a D. C. voltage E from a source having terminals 4 and 5 applied over lines 6 and 7 to a load 8, in series with a resistor 9. A rectifier element 10, such as that of Figs. 1 and 2 is shunted across the load; and the effect of this rectifier is to keep the D. C. voltage across the load substantially constant in spite of any variations which may occur at the source 4, 5.

The rectifier 10 is connected in the circuit in the polarity which sends current from the D. C. source through it in the forward direction. Accordingly, substantially no current will flow through the rectifier until the threshold value of voltage at point T+ is reached, beyond which there is a sudden increase of current which increases the current flowing through resistor 9, thereby increasing the voltage drop across the resistor. This has the effect of maintaining the voltage across rectifier 10 and load 8 at the threshold value, ordinarily about .6 volt. This low forward threshold voltage imposes a serious limitation on the use of the forward threshold of the rectifier characteristic, because most loads are operated at more than .6 volt.

It is possible, however, to increase the regulated voltage across the load by using a number of rectifier elements in series. Fig. 5 shows an arrangement of a number of rectifier elements 11 such as those of Figs. 1 and 2 arranged in series with each other, the base plate of one being in contact with the counterelectrode of the next. It is practical to use up to about ten such elements in series, but it is not practical to use much more than ten. Since there will be about .6 volt across each element, the voltage across a stack of ten series-arranged elements will be about 6 volts. This is a useful regulated value for some loads such as 6 volt filaments of vacuum tubes; but it is not practical to use this arrangement with loads requiring voltages much in excess of about 6 volts.

It has been known that much higher voltages would be allowed across the load by use of the threshold knee T— on the negative side of the characteristic curve of Fig. 3. The reason for this is, of course, that the negative threshold occurs at much higher voltages than the positive threshold; and it very commonly lies between seven and ten volts negative, as shown in the curve. Accordingly, by reversing the polarity of the rectifier from that of Fig. 4 to that of Fig. 6, about seven to ten volts can be allowed across the load; and by use of a series arrangement of up to about ten elements in series, as shown in Fig. 5, load voltages of about seventy to one hundred volts may be allowed across the load.

A serious obstacle to the use of the negative threshold for regulating purposes, however, resides in the fact that the negative threshold ordinarily has a bad "drift," resulting from the tendency of selenium rectifiers to "form." On account of this factor the threshold voltage in the reverse direction ordinarily varies with time of use, the longer the time of use the higher being the threshold voltage. This drift, of course, produces a corresponding undesired change of the voltage across the load.

In accordance with the present invention means is provided for stabilizing the threshold point in the reverse direction so that the reverse threshold can be used for regulation purposes. This is done by the addition of a limited proportion of tellurium to the selenium of the semi-conductor layer 2 in the rectifier. The proportion of tellurium should be about ninety to twelve hundred parts per million parts of the selenium by weight. If substantially less than about ninety parts of tellurium to each million parts of selenium, by weight, is used there will not be enough stabilization of the negative threshold; and if substantially more than about twelve hundred parts of tellurium per million parts of selenium, by weight, is used, the element ceases to be a rectifier. It is known, for instance, that ordinarily a mixture of tellurium and selenium wherein the tellurium is present in significant or substantial proportions, does not permit the formation of an effective blocking layer which is required to make the element a rectifier. But by keeping the proportion of the tellurium down below the limit of about 1200 parts per million, the formation of the barrier layer is not seriously affected; and the negative threshold is found to be kept substantially constant.

The discovery that there is this narrow critical range of about ninety to twelve hundred parts of tellurium per million parts of selenium which results in a good rectifier of stable negative threshold voltage is unexpected; for it has heretofore been generally understood that the effect of adding tellurium to selenium in sufficient quantity to have any noticeable effect was to prevent the rectifier from rectifying.

The tellurium can be added to the selenium in any convenient manner. For example, if the rectifier is made by the well-known method of melting amorphous selenium powder and spreading it on the base plate, followed by crystallization under a heat treatment, the tellurium can be added to the amorphous selenium in the form of a powder thoroughly mixed with the selenium powder for uniformity of composition. In this process the selenium-tellurium powder mixture can be melted and applied to the base plate 1 in the same way that selenium alone is applied to the base plate. The heat treatment can then be carried out in the same way as with selenium alone. This can be done, for example, by heating the solidified selenium-tellurium layer on the base plate for about an hour at a temperature of about 217° C. which is a few degrees below the melting point of selenium. To aid the crystallization, pressure can be applied, if desired, by placing a pressure platen over the selenium-tellurium layer and applying a pressure of, for example, around 1000 pounds per square inch.

Another way of making the rectifier is to mix the tellurium powder with selenium powder and apply the powder mixture to the base plate by the so-called pressed-powder method. This involves thoroughly mixing the selenium and tellurium powder into a homogeneous mixture and then sprinkling the powder on the base plate, after which a pressure platen can be applied to the surface of the powder, thus compressing the powder against the base plate at a pressure of around one thousand pounds per square inch and at a temperature of about 125° to 130° C. for one or two minutes or more, thereby producing a sintering and coalescing of the powder and close adherence to the base plate. This will then be followed by the above-mentioned annealing treatment performed by heating for a time such as a half-hour or an hour at around 217° C. This will result in the layer 2 of Figs. 1 and 2 of selenium containing the very small proportion of tellurium.

Regardless of how the selenium-tellurium layer is applied to the base plate, the counterelectrode 3 can be applied to the selenium surface in a well-known manner, for example, by spraying in molten form a substance such as Wood's metal or some other alloy such as a cadmium bismuth alloy. Where such an alloy is used, the cadmium and bismuth can be used in about equal parts by weight.

The selenium to be utilized in making this rectifier is the "pure," or "rectifier type" selenium available on the market. Use of this type of selenium is necessary in rectifier manufacture, even when additives are later to be put into said selenium. For example, this rectifier type of selenium contains not more than nine parts per million of tellurium, and similarly strict tolerances are set for other impurities. This not only yields a selenium which is useable in rectifiers, but allows additives to be put into the selenium, in total amounts which can be closely controlled.

It should be understood that desired additives may be put into the selenium to improve the properties, such as the forward conductivity, in a well-known manner. For example, it is common to add halogen to the selenium for this purpose. Furthermore, it should be understood that desired expedients of which many are known, can be used for improving the barrier layer by which the rectifying action occurs; and since such expedients are no part of the present invention, they are not described here.

After the rectifier element is thus made, it should be electroformed to develop its barrier layer and make it act as a rectifier. This is a well known process ordinarily involving the application of an alternating voltage across the rectifier, preferably in series with some resistance. For example, an A. C. voltage in the order of around 6 volts in series with the rectifier element and about a 15 ohm resistance will serve the purpose. After unidirectional current is observed to flow through the rectifier, the rectifier is ready for use. This is a well known process needing no further discussion here.

I claim:

1. A selenium rectifier having a base plate, a semi-conductor layer on the base plate and a counterelectrode layer over the semi-conductor layer, said semi-conductor layer comprising rectifier type selenium and tellurium in the proportion of about 90 to 1200 parts tellurium and 1,000,000 parts rectifier type selenium, by weight, whereby the threshold value of voltage in the reverse direction is substantially constant.

2. In a dry-plate rectifier of the type having a base plate, a semi-conductor layer over the base plate comprising rectifier type selenium, and a counterelectrode layer over the semi-conductor layer, the improvement which comprises adding 90 to 1200 parts by weight of tellurium per million parts by weight of selenium into the semi-conductor layer, whereby the threshold value of voltage in the reverse direction is substantially stabilized.

3. A selenium rectifier having a base plate, a semi-conductor layer on the base plate and a counterelectrode layer over the semi-conductor layer, said semi-conductor layer consisting of rectifier type selenium and tellurium in the proportion of about 90 to 1200 parts tellurium and 1,000,000 parts rectifier type selenium, by weight, whereby the threshold value of voltage in the reverse direction is substantially constant.

4. In a dry-plate rectifier of the type having a base plate, a semi-conductor layer over the base plate consisting of rectifier type selenium, and a counterelectrode over the semi-conductor layer, the improvement which comprises adding 90 to 1200 parts by weight of tellurium per million parts by weight of rectifier type selenium into the semi-conductor layer, whereby the threshold value of voltage in the reverse direction is substantially stabilized.

References Cited in the file of this patent

UNITED STATES PATENTS

| | | |
|---|---|---|
| 794,459 | Hogg | July 11, 1905 |
| 1,856,865 | Darrah | May 3, 1932 |
| 1,866,351 | Hollnagel et al. | July 5, 1932 |
| 2,414,295 | Gardner | Jan. 14, 1947 |

OTHER REFERENCES

Mellor: Comp Treatise on Inorganic and Theoretical Chemistry, vol. 10 (1930), pp. 698–700.